United States Patent
Smirnov (10) Patent No.: US 8,198,772 B2
(45) Date of Patent: Jun. 12, 2012

(54) SPINDLE MOTOR

(75) Inventor: Viatcheslav Smirnov, Suwon-si (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 316 days.

(21) Appl. No.: 12/611,509

(22) Filed: Nov. 3, 2009

(65) Prior Publication Data

US 2010/0148609 A1    Jun. 17, 2010

(30) Foreign Application Priority Data

Dec. 15, 2008   (KR) .................. 10-2008-0127486

(51) Int. Cl.
 *H02K 5/16*   (2006.01)
 *H02K 5/24*   (2006.01)
 *G11B 33/08*  (2006.01)

(52) U.S. Cl. ......... 310/91; 310/51; 310/67 R; 360/99.08

(58) Field of Classification Search ............ 310/51, 310/67 R, 91; 360/99.08
 See application file for complete search history.

(56) References Cited

U.S. PATENT DOCUMENTS

| | | | | |
|---|---|---|---|---|
| 5,334,895 A * | 8/1994 | Morioka et al. | ............ | 310/67 R |
| 5,483,398 A * | 1/1996 | Boutaghou | ............ | 360/97.02 |
| 5,602,697 A * | 2/1997 | Jeong et al. | ............ | 360/97.02 |
| 5,798,887 A * | 8/1998 | Yoshida et al. | ............ | 360/99.08 |
| 6,205,110 B1 * | 3/2001 | Miyamoto et al. | ............ | 369/266 |
| 6,256,173 B1 * | 7/2001 | Chee et al. | ............ | 360/265.7 |
| 6,407,882 B1 * | 6/2002 | Katahara et al. | ............ | 360/99.08 |
| 6,501,615 B1 * | 12/2002 | Kelsic et al. | ............ | 360/97.02 |
| 6,510,021 B1 * | 1/2003 | Woldemar et al. | ............ | 360/97.01 |
| 6,924,962 B2 * | 8/2005 | Jeong | ............ | 360/265.6 |
| 7,057,849 B2 * | 6/2006 | Soderfelt et al. | ............ | 360/97.01 |
| 7,372,662 B2 * | 5/2008 | Xu et al. | ............ | 360/97.02 |
| 7,382,068 B2 * | 6/2008 | Hsu et al. | ............ | 310/51 |
| 2005/0185329 A1 * | 8/2005 | Miyajima et al. | ............ | 360/99.08 |
| 2007/0228851 A1 * | 10/2007 | Smirnov et al. | ............ | 310/90 |
| 2007/0257574 A1 * | 11/2007 | Kim et al. | ............ | 310/90 |
| 2007/0273238 A1 * | 11/2007 | Nomura et al. | ............ | 310/217 |

* cited by examiner

*Primary Examiner* — Burton Mullins
(74) *Attorney, Agent, or Firm* — McDermott Will & Emery LLP

(57) ABSTRACT

A spindle motor can include a rotor support piece, which may rotatably support a rotor that is inserted onto one end, and which may include a projecting part that protrudes from the other end and a mounting part that has a flat surface formed along the periphery of the projecting part; a base plate, in which an insertion hole may be formed for inserting the projecting part through, and on which multiple support protrusions may be formed along the periphery of the insertion hole for supporting the mounting part along a periphery of the insertion hole; and a buffer member, which may include a projecting-part hole for inserting the projecting part through and support-protrusion holes for inserting the support protrusions through, and which may be positioned between the rotor support piece and the base plate to absorb vibration. This arrangement can reduce the occurrence and transfer of vibrations.

4 Claims, 9 Drawing Sheets

SPINDLE MOTOR

CROSS-REFERENCE TO RELATED APPLICATIONS

This application claims the benefit of Korean Patent Application No. 10-2008-0127486, filed with the Korean Intellectual Property Office on Dec. 15, 2008, the disclosure of which is incorporated herein by reference in its entirety.

BACKGROUND

1. Technical Field

The present invention relates to a spindle motor.

2. Description of the Related Art

A spindle motor is commonly used as an apparatus for rotating a mounted disk, and may be used in various devices such as optical disk drives, magnetic disk drives, and hard disk drives.

When a spindle motor undergoes rotation, however, various factors, such as defects in the spindle motor parts, eccentricity in the assembly of the disk, and irregular airflow within the disk drive, may lead to the occurrence of vibration.

Such vibration is liable to cause track misregistration (TMR), and hence to an increase in position error signals (PES), resulting in lower reliability in reading and writing data. Problems caused by vibration have become increasingly serious due to the rapid increase of data density in the disk.

In particular, if a base plate is rigidly coupled to the rotor, the vibration may be transferred to the encoder, etc., that reads signals from the disk, leading to even more serious problems.

SUMMARY

One aspect of the invention provides a spindle motor that reduces the occurrence and suppresses the transfer of vibrations.

A spindle motor according to another aspect of the invention can include a rotor support piece, which may rotatably support a rotor that is inserted onto one end, and which may include a projecting part that protrudes from the other end and a mounting part that has a flat surface formed along the periphery of the projecting part; a base plate, in which an insertion hole may be formed for inserting the projecting part through, and on which multiple support protrusions may be formed along the periphery of the insertion hole for supporting the mounting part along a periphery of the insertion hole; and a buffer member, which may include a projecting-part hole for inserting the projecting part through and support-protrusion holes for inserting the support protrusions through, and which may be positioned between the rotor support piece and the base plate to absorb vibration.

In certain embodiments, one or more protrusion cavities opened towards the other side of the base plate may be formed in one or more of the support protrusions, and portions at the end of the projecting part may be partially pressed into the one or more protrusion cavities.

The support protrusions and the protrusion cavities can be formed as a set by a pressing process such that the base plate has a constant thickness.

The support protrusions can be formed adjoining the insertion hole, while the protrusion cavities can be opened towards an inner perimeter of the insertion hole.

Furthermore, the insertion hole can have a circular shape, with the support protrusions arranged in equal intervals around a periphery of the insertion hole.

Additional aspects and advantages of the present invention will be set forth in part in the description which follows, and in part will be obvious from the description, or may be learned by practice of the invention.

DETAILED DESCRIPTION

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention.

While such terms as "first" and "second," etc., may be used to describe various components, such components must not be limited to the above terms. The above terms are used only to distinguish one component from another.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The spindle motor according to certain embodiments of the invention will be described below in more detail with reference to the accompanying drawings. Those components that are the same or are in correspondence are rendered the same reference numeral regardless of the figure number, and redundant explanations are omitted.

Figure 1:
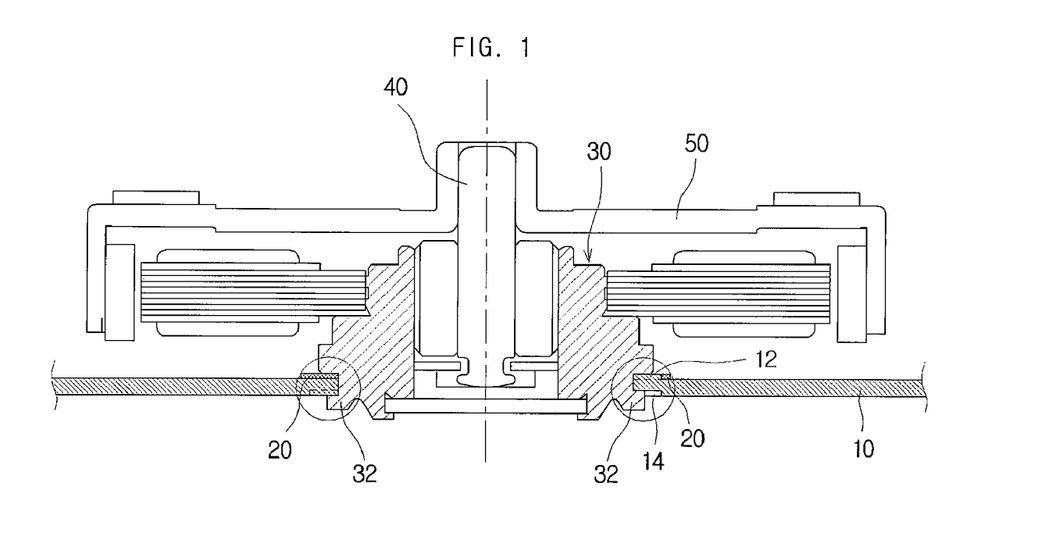
FIG. 1 is a cross-sectional view of a spindle motor according to an embodiment of the invention.
Figure 2:
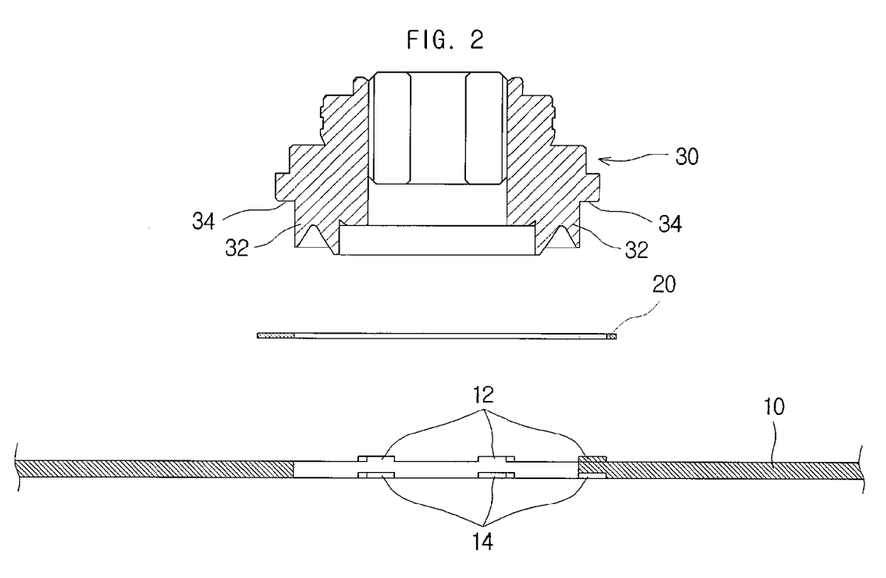
FIG. 2 illustrates a spindle motor according to an embodiment of the invention before assembly.
Figure 3:
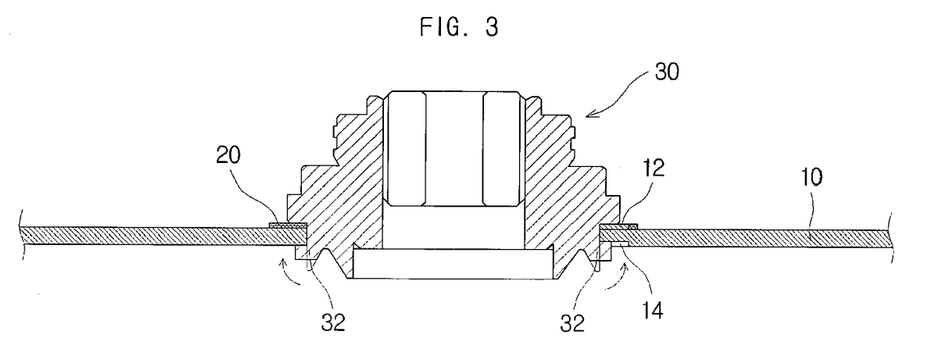
FIG. 3 illustrates a spindle motor according to an embodiment of the invention after assembly.
Figure 4:
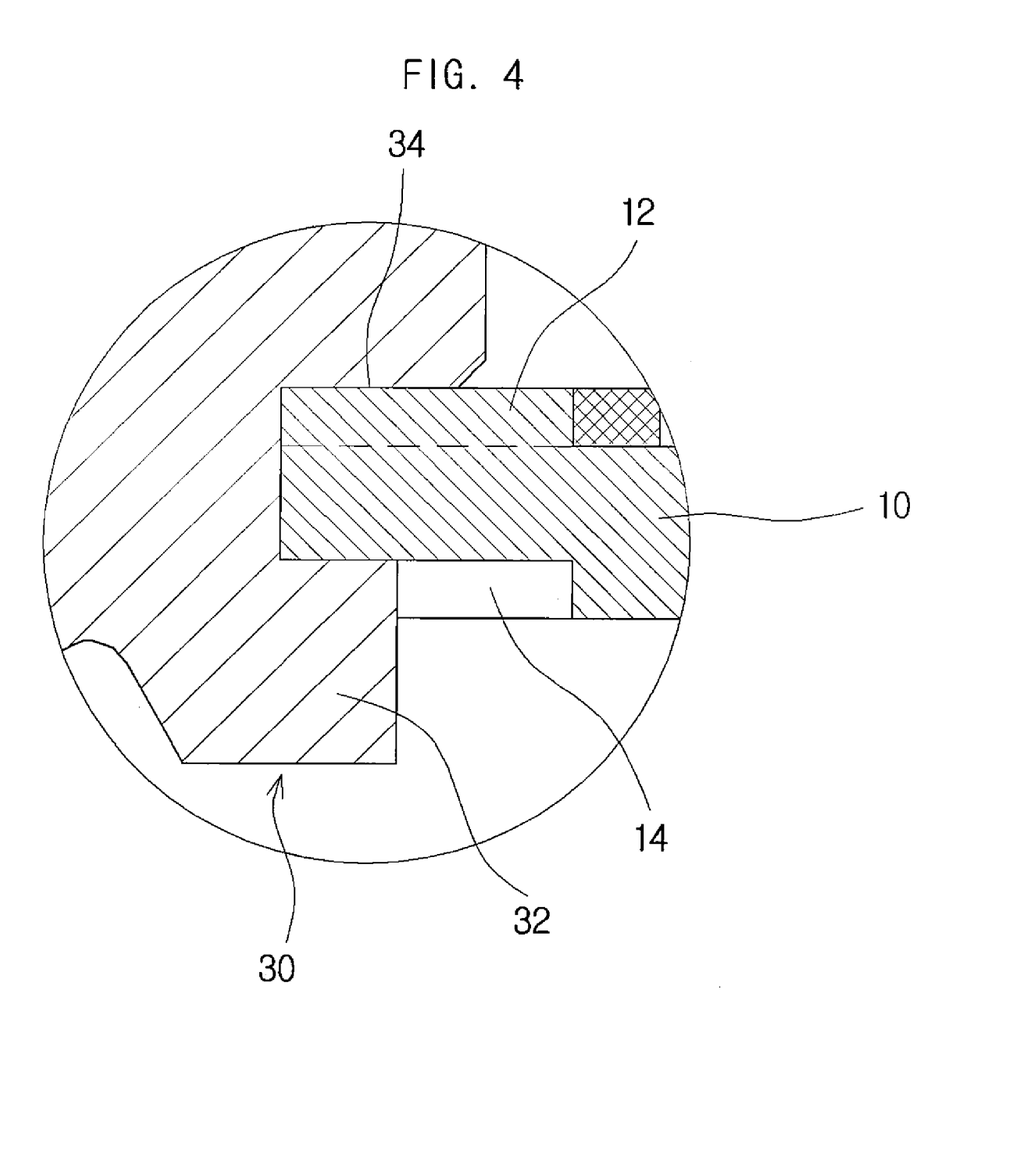
FIG. 4 is a cross-sectional view of a support protrusion in a spindle motor according to an embodiment of the invention.
Figure 5:
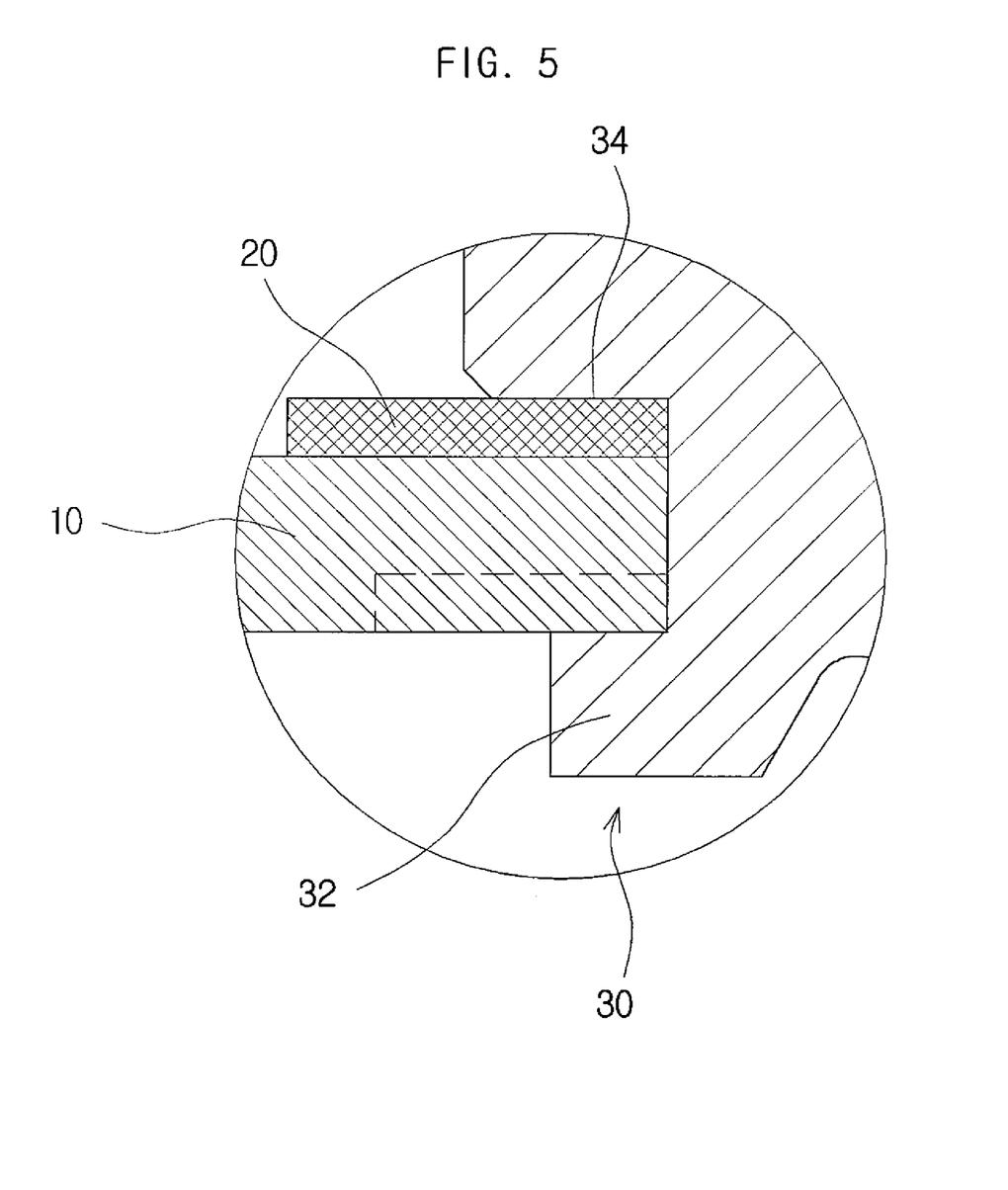
FIG. 5 is a cross-sectional view of a buffer member in a spindle motor according to an embodiment of the invention.
Figure 6:
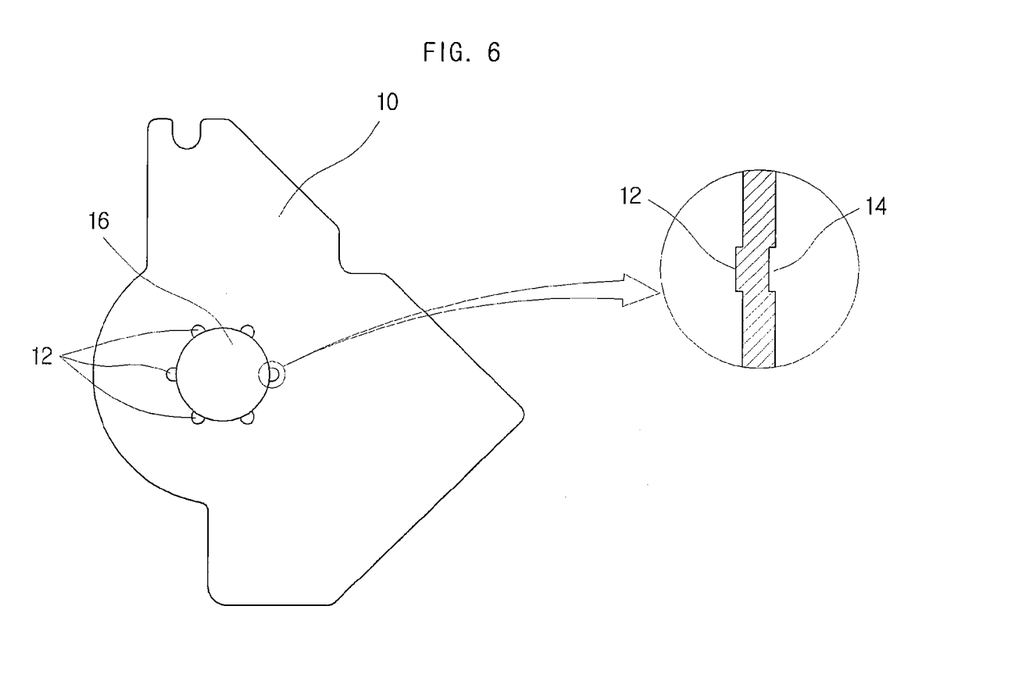
FIG. 6 is a plan view of a base plate in a spindle motor according to an embodiment of the invention.
Figure 7:
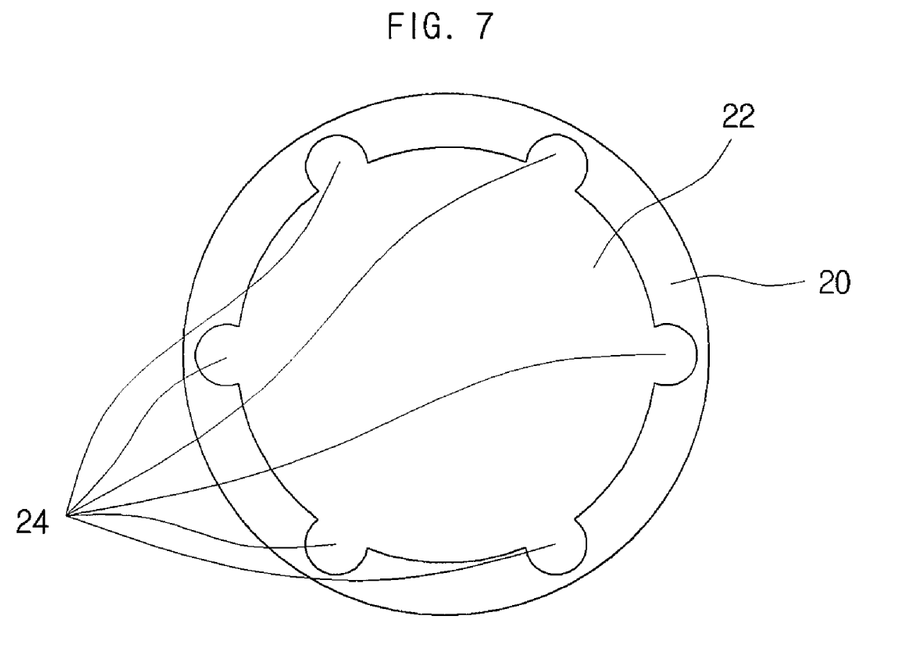
FIG. 7 is a plan view of a buffer member in a spindle motor according to an embodiment of the invention.

FIG. 1 is a cross-sectional view of a spindle motor according to an embodiment of the invention. FIG. 2 illustrates a spindle motor according to an embodiment of the invention before assembly, while FIG. 3 illustrates a spindle motor according to an embodiment of the invention after assembly. FIG. 4 is a cross-sectional view of a support protrusion in a spindle motor according to an embodiment of the invention, FIG. 5 is a cross-sectional view of a buffer member in a spindle motor according to an embodiment of the invention, FIG. 6 is a plan view of a base plate in a spindle motor according to an embodiment of the invention, and FIG. 7 is a plan view of a buffer member in a spindle motor according to an embodiment of the invention.

In FIGS. 1 through 7, there are illustrated a base plate 10, support protrusions 12, protrusion cavities 14, an insertion hole 16, a buffer member 20, a projecting-part hole 22, support-protrusion holes 24, a rotor support piece 30, a projecting part 32, a mounting part 34, a rotation shaft 40, and a rotor case 50.

A spindle motor according to an embodiment of the invention can include a rotor support piece 30, a base plate 10, and a buffer member 20 positioned between the rotor support piece 30 and the base plate 10 to absorb vibration. The rotor support piece 30 can rotatably support a rotor inserted into one end of the rotor support piece 30. The rotor support piece 30 can include a projecting part 32 and a mounting part 34, where the projecting part 32 may protrude from the other end of the rotor support piece 30, and the mounting part 34 may have a flat surface formed along a periphery of the projecting part 32. An insertion hole 16 can be formed in the base plate 10, while multiple support protrusions 12 can be formed on one side of the base plate 10. The projecting part 32 can be inserted through the insertion hole 16, and the support protrusions 12 can support the mounting part 34 along a periphery of the insertion hole 16. The buffer member 20 can include a projecting-part hole 22 and support-protrusion holes 24, where the projecting part 32 may be inserted through the projecting-part hole 22, and the support protrusions 12 may be inserted through the support-protrusion holes 24. This arrangement can reduce the occurrence of vibration and block the transfer of vibrations to other parts.

The rotor support piece 30 may rotatably support the rotor of the spindle motor, and may be secured to the base plate 10 described later. To this end, the rotor can be rotatably inserted onto one end of the rotor support piece 30, while the projecting part 32 can be formed at the other end that is to be inserted through the base plate 10. Along the periphery of the projecting part 32, a flat mounting part 34 can be formed, by way of which the rotor support piece 30 may be mounted on the base plate 10.

Looking at a more detailed example with reference to FIGS. 1 to 3, a rotation shaft 40 coupled to a rotor case 50, which rotates the disk, can be inserted from above to be connected, by way of a bearing, with the rotor support piece 30. At a lower portion of the rotor support piece 30, a flange can be formed, as well as a cylindrical projecting part 32. The flange may serve as the mounting part 34 that is positioned on the base plate 10, while the projecting part 32 may be inserted through the base plate 10. Here, the end portion of the projecting part 32 can be formed with a tapered edge in such a way that the end portion may be spread outwards after it is inserted. This embodiment can be implemented using a metallic bearing holder for the rotor support piece 30, but it is apparent that the invention is not thus limited. Other shapes and materials that allow the rotor support piece 30 to support the rotation of the rotor can be used.

The base plate 10 may secure the rotor support piece 30 and may provide an area in which the encoder, the board, etc. are installed. In order that the base plate 10 may more readily secure the rotor support piece 30, an insertion hole 16, through which the projecting part 32 of the rotor support piece 30 may be inserted, can be formed in the base plate 10. Also, in order that the amount of vibration transferred from the rotor support piece 30 to the base plate 10 may be reduced, the base plate 10 can support the mounting part 34 of the rotor support piece 30 by way of multiple support protrusions 12 formed along the periphery of the insertion hole 16. This can decrease the contact area between the rotor support piece 30 and the base plate 10, and thus the amount of vibration transferred may be reduced.

Looking at a more detailed example with reference to FIGS. 2 to 6, the base plate 10 according to this embodiment can include the insertion hole 16, through which the cylindrical projecting part 32 may be inserted, and can include support protrusions 12, which support the flange of the rotor support piece 30, formed around the insertion hole 16. Thus, the flange of the rotor support piece 30 may contact the base plate 10 by way only of the upper surfaces of the support protrusions 12.

To support the rotor support piece 30 with greater stability, the support protrusions 12 can be arranged in equal intervals around the periphery of the insertion hole 16.

Also, in order to prevent slipping between the rotor support piece 30 and the base plate 10 during the rotation of the spindle motor, one or more cavities, which may hold the portions of the projecting part 32 of the rotor support piece 30 when the end portion of the projecting part 32 are pressed in, can be formed. In particular, the protrusion cavities 14 can be formed at the opposite side of the support protrusions 12, to be connected with the insides of the protrusions.

This approach of forming protrusion cavities 14 for holding the end portions of the projecting part 32 of the rotor support piece 30, compared to the approach of forming perforated holes, can provide the advantage of improved strength in the base plate 10. Also, since the surface area supporting the end portions of the projecting part 32 may be greater compared to the case of merely forming holes, slipping of the rotor support piece 30 may be prevented with greater efficiency.

Looking at a more detailed example with reference to FIGS. 2 to 6, the base plate 10 can include hemispherical support protrusions 12 on the upper surface, while protrusion cavities may be formed on the opposite side of the support protrusions 12. The projecting part 32 of the rotor support piece 30 can be fitted through the insertion hole 16 of the base plate 10. Afterwards, in order to secure the rotor support piece 30, portions on the end of the projecting part 32 can be bent outwards and pushed towards the base plate 10. In this way, part of the end portions of the projecting part 32 can be pressed into the protrusion cavities 14 formed in the lower surface of the base plate 10, as illustrated in FIG. 4, so that the rotor support piece 30 may not slip from the base plate 10 when the rotor is rotated.

Here, the support protrusions 12 and the protrusion cavities 14 can be formed as a set by a pressing process, allowing the base plate 10 to maintain a constant thickness. In a more detailed example, the protrusion cavities 14 can be formed by performing a pressing operation from underneath the base plate 10 so as to form the support protrusions 12 and the protrusion cavities 14 as a set. This can form the support protrusions 12, which protrude upwards in correspondence with the shapes of the protrusion cavities 14, on the upper surface of the base plate 10. Thus, the base plate 10 can maintain a constant thickness, to thereby avoid problems of lowered strength that may occur due to reduced thickness when forming cavities. Furthermore, the portions of the base plate 10 may be given a tighter structure by the pressing, and therefore improved strength. As such, the thin base plate 10 can maintain a sufficient strength for preventing the rotor support piece 30 from slipping.

The support protrusions 12 can be formed adjoining the insertion hole 16, and the protrusion cavities 14 can be open towards the inner perimeter of the insertion hole 16. As illustrated in FIG. 4, the support protrusions 12 can be formed directly adjoining the insertion hole 16, and the protrusion cavities 14 can be formed to connect to the inner perimeter of the insertion hole 16. This arrangement can better facilitate the pressing in of the end portion of the projecting part 32 of the rotor support piece 30. The arrangement allows a greater portion to be pressed in, and thus provides a more secure joint.

Figure 8:
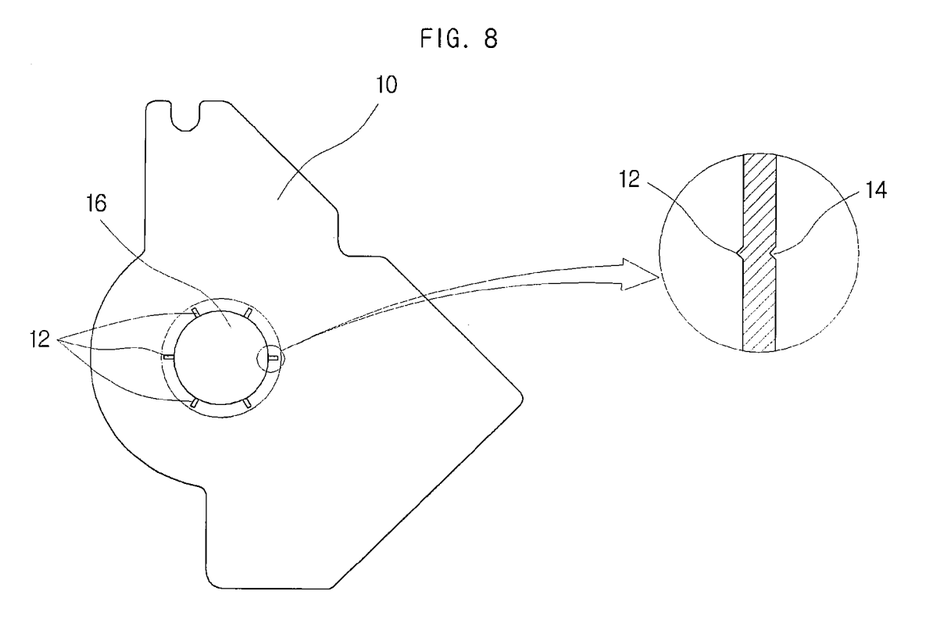
FIG. 8 is a plan view of a base plate in a spindle motor according to another embodiment of the invention.

The shapes of the support protrusions 12 and protrusion cavities 14 are not limited to those presented in this embodiment. Other variations may also be used, such as that illustrated in FIG. 8, as long as the rotor support piece 30 can be effectively prevented from slipping and the pressing in of the end portions of the projecting part 32 can be facilitated.

The buffer member 20 can attenuate vibrations generated in the rotor support piece 30 and prevent the vibrations from being transferred through the base plate 10 to the encoder, board, etc. To this end, the buffer member 20 can be positioned between the rotor support piece 30 and the base plate 10. Also, a projecting-part hole 22, through which the projecting part 32 may pass, and support-protrusion holes 24, through which the support protrusions 12 may pass, can be formed in the buffer member 20 so as not to obstruct the base plate 10 supporting the rotor support piece 30. An elastic material, such as rubber, etc., or a ductile material, such as aluminum, etc., can be used to absorb the vibration. In cases where resonance occurs in the spindle motor, the material of the buffer member 20 can be changed to alter the natural frequency, whereby the resonance can be eliminated.

Looking at a more detailed example with reference to FIGS. 5 and 7, a buffer member 20 according to this embodiment may, to better support the flange of the rotor support piece 30, have an annular shape corresponding with the shape of the flange. In the center, a projecting-part hole 22, through which the projecting part 32 may pass, can be formed, and along the periphery of the projecting-part hole 22, support-protrusion holes 24, through which the support protrusions 12 may pass, can be formed. This arrangement can be placed between the flange of the rotor support piece 30 and the base plate 10, as in the example illustrated in FIG. 5, to reduce vibrations generated in the rotor support piece 30 and minimize the transfer of vibrations to the base plate 10.

Figure 9:
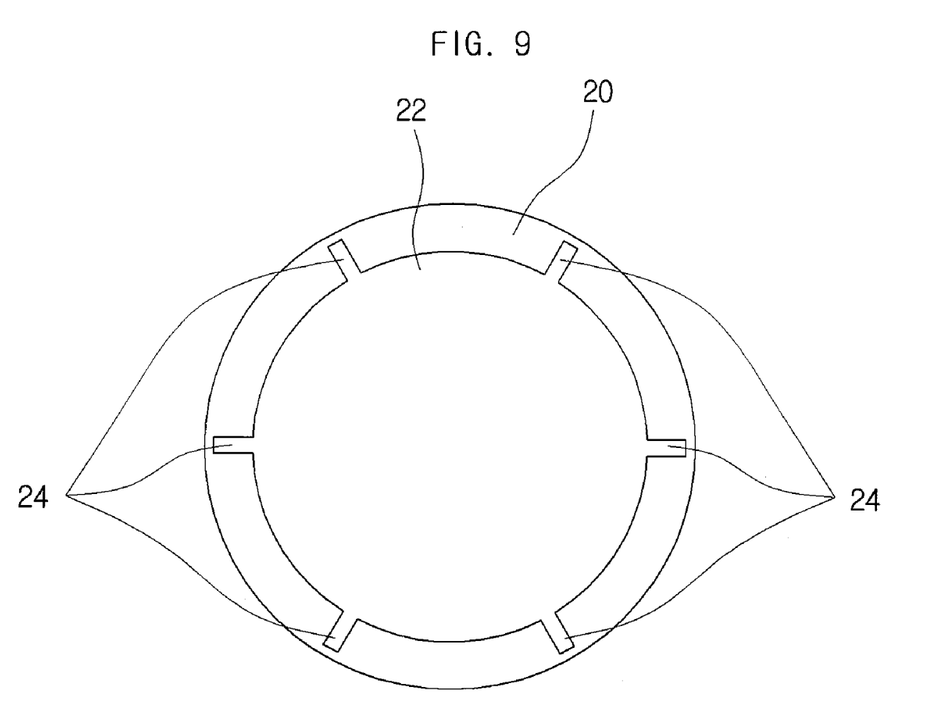
FIG. 9 is a plan view of a buffer member in a spindle motor according to another embodiment of the invention.

The shape of the support-protrusion holes 24 is not limited to that described in this embodiment. Various other shapes that correspond with the shapes of the support protrusions 12 may also be used, such as that illustrated in FIG. 9.

While the spirit of the invention has been described in detail with reference to particular embodiments, the embodiments are for illustrative purposes only and do not limit the invention. It is to be appreciated that those skilled in the art can change or modify the embodiments without departing from the scope and spirit of the invention.

Many embodiments other than those set forth above can be found in the appended claims.

What is claimed is:

1. A spindle motor comprising:
    a rotor support piece rotatably supporting a rotor inserted into one end thereof, the rotor support piece comprising a projecting part and a mounting part, the projecting part protruding from the other end of the rotor support piece, the mounting part having a flat surface formed along a periphery of the projecting part;
    a base plate having an insertion hole formed therein and having a plurality of support protrusions formed on one side thereof, the projecting part inserted through the insertion hole, the support protrusions supporting the mounting part along a periphery of the insertion hole; and
    a buffer member interposed between the rotor support piece and the base plate to absorb vibration, the buffer member having a projecting-part hole and support-protrusion holes formed therein, the projecting part inserted through the projecting-part hole, the support protrusions inserted through the support-protrusion holes,
    wherein the support protrusion has a protrusion cavity therein, the protrusion cavity opening towards another side of the base plate, and
    an end portion of the projecting part is partially pressed into the protrusion cavity.

2. The spindle motor of claim 1, wherein the plurality of support protrusions and the protrusion cavity are formed as a set by a pressing process such that the base plate has a constant thickness.

3. The spindle motor of claim 1, wherein the plurality of support protrusions adjoin the insertion hole, and the protrusion cavity opens towards an inner perimeter of the insertion hole.

4. The spindle motor of claim 1, wherein the insertion hole has a circular shape, and the plurality of support protrusions are arranged in equal intervals around a periphery of the insertion hole.

* * * * *